Oct. 30, 1934.     A. HOARE     1,979,200
FILTER OR STRAINER
Filed Dec. 28, 1931     2 Sheets-Sheet 2
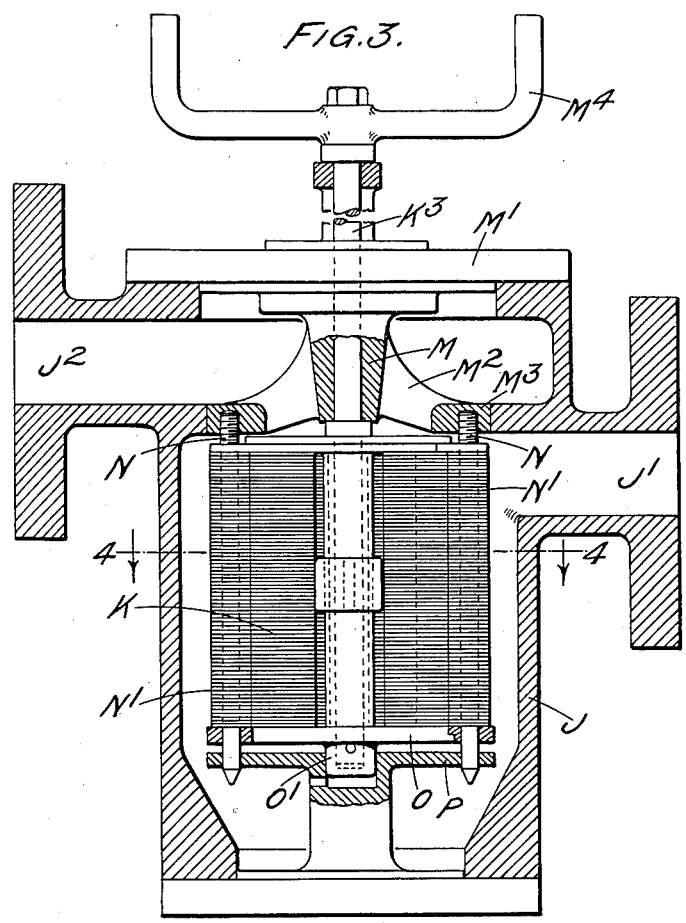
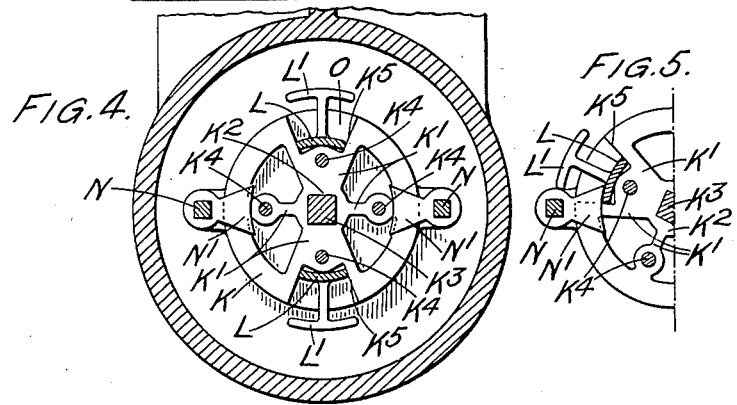

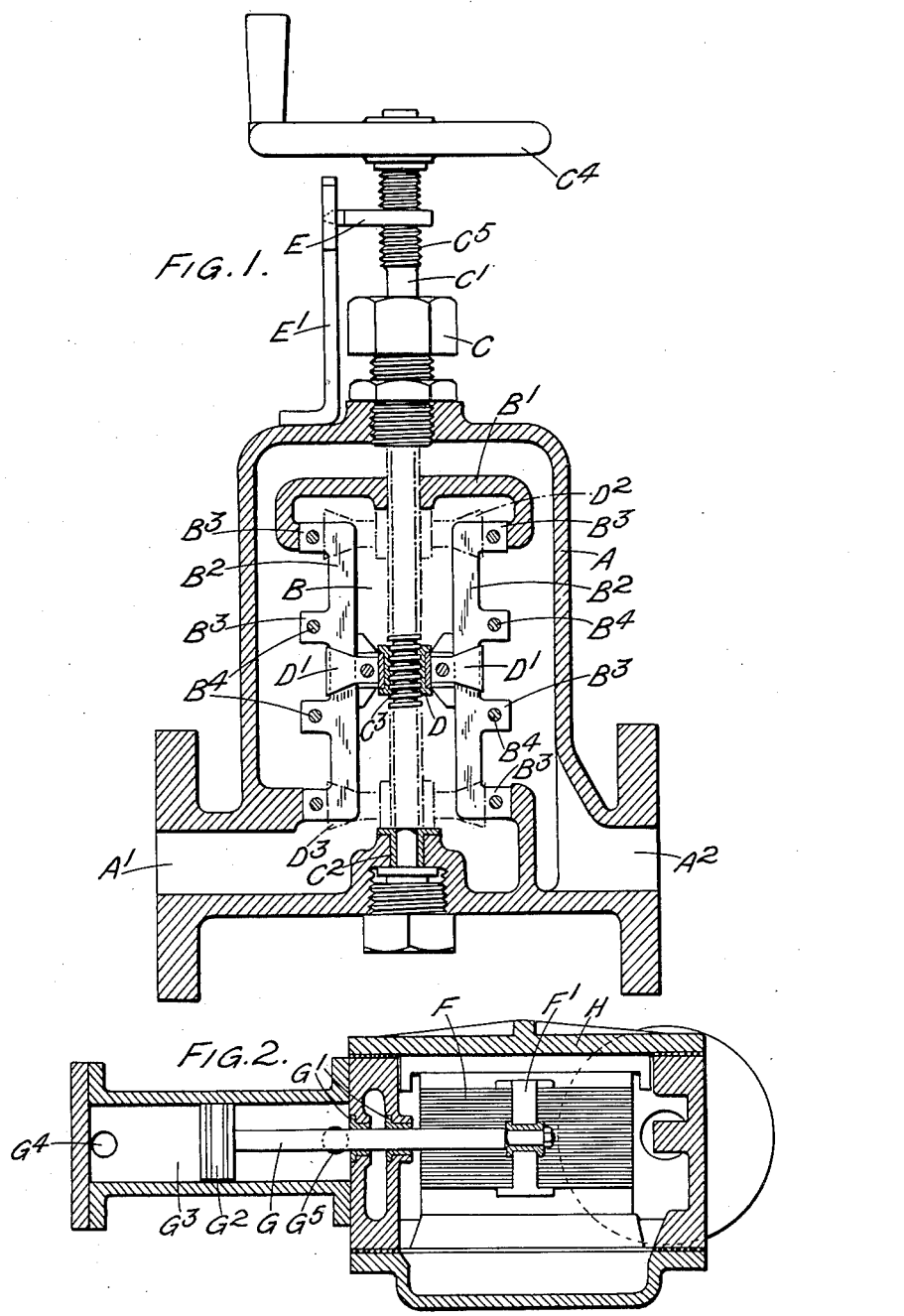

Patented Oct. 30, 1934

1,979,200

UNITED STATES PATENT OFFICE 1,979,200

FILTER OR STRAINER

Arthur Hoare, Carisbrooke, Isle of Wight, England, assignor of one-half to J. Samuel White & Company Limited, East Cowes, Isle of Wight, England, a registered company of Great Britain Application December 28, 1931, Serial No. 583,533
In Great Britain December 31, 1930

12 Claims. (Cl. 210—167)

This invention relates to filters or strainers and has for its object to provide an improved filter of the kind comprising a straining wall provided with one or more slots through which the liquid is strained, a scraper blade permanently in engagement with each slot and means for causing relative movement between each blade and its slot so that the blade can be moved backwards and forwards along the slot for the purpose of cleaning the slot.

In a filter or strainer of the above kind according to the present invention not only is each slot formed or arranged with one or both ends open but the edge of the scraper blade as the latter makes its cleaning movement relatively to the slot can emerge through the open end of the slot whereby foreign matter can be ejected by the blade from the open end of the slot, while further movement of the blade out of the end of the slot after its edge has emerged therefrom is prevented. In this way the ejection of foreign matter removed from within the slot by the blade is ensured while on the return travel of the blade any foreign matter which may cling to the edge of the blade tends to be removed as this edge re-enters the slot.

The form of the straining wall and the arrangement of the slot or slots therein may vary, but in one convenient arrangement a part cylindrical straining wall is provided with one or more circumferential straining slots through which the liquid to be strained flows radially, the straining wall having a part cut away so as to break the continuity of each slot in the circumferential direction and provide each slot with an open end, means being provided for preventing the radial flow of liquid through the cut-away part or parts of each slot. A scraper blade is in continuous engagement with each slot and means are provided for producing relative oscillating movement between the scraper blade or blades and the straining wall about the axis of the latter, so that the scraper blades travel along the slots and, towards the end of their travel, the leading edge of each scraper blade emerges through the open end of its slot so as to eject the foreign matter removed from the slot by the blade, the extent to which the edges of the blades can emerge from the slots being limited by a stop.

In an alternative arrangement a straining wall may be substantially flat and may have a series of substantially straight straining slots provided with open ends and a scraper blade in continuous engagement with each slot, means being provided for reciprocating the blades within the slots for cleaning purposes so that the leading edges of the blades emerge through the open ends of the slots towards the end of their cleaning movement in either direction and are then prevented by a stop from further movement in such direction. In such an arrangement two substantially parallel flat straining walls may be provided, each having a series of straining slots, a support for a series of scraper blades engaging the slots being disposed and movable between these parallel straining walls.

In any case the movement of the blades relatively to the slots may be effected either manually or hydraulically.

The invention may be carried into practice in various ways but three alternative constructions according to this invention are illustrated by way of example in the accompanying drawings, in which Figure 1 is a sectional side elevation of one construction of filter according to this invention, in which the cleaning movement of the blades is effected manually, Figure 2 is a sectional side elevation of a modified construction in which the cleaning movement of the blades is effected hydraulically.

Figure 3 is a similar view to Figure 1 of an alternative construction of filter according to this invention, Figure 4 is a section on the line 4—4 of Figure 3, and Figure 5 is a plan of the straining walls and cleaning blades of the construction shown in Figures 3 and 4 with the cleaning blades at the ends of the slots.

In the construction shown in Figure 1 the filter comprises a casing A having an inlet opening $A^1$ and an outlet opening $A^2$. The inlet opening $A^1$ communicates with the lower end of a chamber B of substantially rectangular cross-section the upper end of which is closed by a wall $B^1$ forming part of or rigidly connected to the casing A. Two parallel opposite sides of the chamber B are closed in by solid walls which may be formed integral with the part $B^1$, while each of the other two parallel opposite side walls is constituted by a series or pack of plates $B^2$, adjacent plates being spaced apart by distance pieces so as to provide between the plates filtering slots of the desired width. As shown the plates $B^2$ are provided with lugs $B^3$ through which pass bolts $B^4$ for clamping the plates and the distance pieces together, the bolts $B^4$ which pass through the lugs at the upper and lower ends of the plates $B^2$ serving also to connect these plates firmly to the lower part of the casing and to the part B¹. It will be seen that with this arrangement the filtering slots between the plates B² are open at their upper and lower ends and that liquid entering through the inlet A¹ must pass laterally through the slots between the packs of plates B² as it flows to the outlet opening A².

Extending through a gland C in the upper wall of the casing A and through an opening in the part B¹, is a spindle C¹ the lower end of which is mounted in a bearing C² in the lower wall of the casing A. The part of this spindle lying between the two packs of plates B² is screwthreaded as shown at C³ and engages a screwthreaded bore in a member D to which are rigidly connected two sets of scraper blades D¹ so constructed and arranged as to lie in and pass completely through the slots between adjacent plates B² in each of the packs of plates.

It will be seen that by rotating the spindle C¹ the member D can be caused to travel along the spindle so that the scraper blades D¹ traverse the filtering slots between the plates B², and the arrangement is such that towards the end of the travel of the member D along the spindle C¹ in either direction, the leading edges only of the scraper blades D¹ will emerge through the open ends of the straining slots between the plates B² as indicated in chain line at D² and D³ so as to eject foreign matter from the ends of the slots. In this way foreign matter which is arrested between the plates is carried by the blades to the ends of the slots and then ejected.

In order to enable the spindle C¹ to be rotated, this spindle carries at its upper end a hand wheel C⁴. Means are also provided for indicating to an operator the position of the blades D¹ in the slots, such indicating means comprising a pointer member E mounted upon a screwthreaded part C⁵ of the spindle C¹ and engaging a slot in a part E¹ mounted upon the upper wall of the casing A. It will be seen that as the hand wheel C⁴ is rotated the member E will be caused to travel along the slot in the part E¹ as the blades D¹ travel along the filtering slots, so that the position of the member E in the slot in the part E¹ will give an indication of the position of the blades D¹ in the filtering slots.

In the alternative construction somewhat diagrammatically illustrated in Figure 2, the general arrangement is similar to that illustrated in Figure 1, the filter proper comprising a pack or series of plates F having slots between them through which extend blades (not shown) mounted on a blade carrier F¹. In this construction the blade carrier, instead of being caused to travel longitudinally by the manual rotation of a screwthreaded shaft as in the construction shown in Figure 1, is directly connected to one end of a piston rod G which passes through glands G¹ in one end of the casing H of the filter and carries at its other end a piston G² arranged within a cylinder G³. Communicating respectively with the opposite ends of the cylinder G³ are passages G⁴, G⁵ through which fluid can be admitted under pressure or allowed to escape. It will be seen that by permitting the escape of fluid through one or other of the passages G⁴, G⁵ and delivering fluid under pressure to the other passage, movement of the piston G² in either direction to cause corresponding movement of the cleaning blades along the slots between the plates of the pack F can be effected.

In the alternative construction illustrated in Figures 3, 4 and 5 the filter comprises a casing J having an inlet opening J¹ and an outlet opening J². Rotatably mounted within the casing J is a substantially cylindrical straining wall built up from a series of superimposed discs or plates K having distance pieces between them so as to form between the circumferential parts of adjacent plates filtering slots of the desired dimensions. Each plate or disc has four radial arms K¹ which connect the peripheral part of the plate to a boss K² through which passes a squared shaft or spindle K³. The plates and distance pieces are clamped together by four bolts K⁴ passing through the radial arms K¹. Each of the plates has parts of its circumferential portion cut away as indicated at K⁵ so that two arcuate filtering slots are provided between each adjacent pair of plates, these filtering slots opening at their ends into the gap formed by the cut-away portions. Radial flow of fluid through the cut-away portions is prevented by two arcuate plate-like members L, while flow of fluid into the lower end of the space enclosed by the filtering wall is prevented by an end plate. The squared spindle K³ passes freely through a boss M of a disc or cover plate M¹ closing an aperture in the upper wall of the outlet passage J² and is provided at its upper end with a handle M⁴ whereby the complete pack of plates constituting the filtering wall can be oscillated. Formed integral with the boss M on the cover plate M¹ is a spider M² having an annular edge M³ closing in a liquid-tight manner an opening separating the chamber in which lies the filter proper from the outlet passage J². This annular portion M³ forms a support for one end of each of two pins or studs N on each of which is mounted a series of scraper blades N¹ projecting into the filtering slots formed between the circumferential portions of adjacent plates K, the pins N being squared as shown so as to prevent angular movement of the scraper blades relatively thereto. Adjacent scraper blades are separated by distance pieces of substantially the same thickness as the plates K, and these blades and the distance pieces are clamped together on the pins N. The lower ends of the pins N pass through holes in a disc-like member O having a central boss O¹ within which is located the lower end of the spindle K³, the boss O¹ and the lower ends of the pins N engaging suitable apertures or sockets in a supporting disc P rigidly connected to the lower end of the casing J.

It will be seen that liquid entering through the inlet opening J¹ must pass through the filtering slots between the circumferential portions of adjacent plates K before it can flow through the outlet opening J². Further, by rocking the spindle K³ by means of the handle M⁴ the complete pack of filtering plates can be oscillated so as to cause the scraper blades N¹ to traverse the filtering slots, the arrangement being such that the edges of these scraper blades can emerge through the open ends of the slots as indicated in Figure 5. In order to prevent the scraper blades emerging completely from the slots the members L conveniently carry stops L¹ which operate as indicated in Figure 5 to limit the movement of the pack of plates K relatively to the scraper blades N¹.

In either of the constructions described above it will be seen that there is little tendency for fluid to flow through the open ends of the slots so that foreign matter ejected from the ends of the slots tends to settle rather than to re-enter the slots.

What I claim as my invention and desire to secure by Letters Patent is:—

1. A liquid strainer including in combination inlet and outlet passages for the liquid, a straining wall having at least one open-ended straining slot through which the liquid can pass from one passage to the other, a scraper blade permanently in engagement with each slot, means for moving each blade along its slot until the leading edge only of the blade emerges from the slot, and means for preventing further movement of the blade out of the open end of the slot after the edge of the blade has thus emerged.

2. A liquid strainer including in combination inlet and outlet passages for the liquid, a straining wall having at least one straining slot open at both ends through which slot the liquid can pass from one passage to the other, a scraper blade permanently in engagement with each slot, means for moving each blade to and fro along the length of its slot, the leading edge only of the blade emerging from the open end of the slot at the end of its movement in each direction, and means for preventing further movement of the blade out of the end of the slot after the edge of the scraper blade has thus emerged.

3. A liquid strainer including in combination inlet and outlet passages for the liquid, a cylindrical straining wall having at least one circumferential straining slot therein through which the liquid can pass radially from one passage to the other, such slot being open at both ends, a scraper blade permanently in engagement with each slot, means for moving each blade to and fro along the length of its slot, the leading edge only of the scraper blade emerging from the open end of the slot at the end of its movement in each direction, and means for preventing further movement of the blade out of the end of the slot after the edge of the scraper blade has thus emerged.

4. A liquid strainer including in combination inlet and outlet passages for the liquid, a cylindrical straining wall having at least one circumferential straining slot through which the liquid can pass radially from one passage to the other, the straining wall having a part cut away so as to break the continuity of each slot in the circumferential direction and provide each slot with open ends, a scraper blade permanently in engagement with each slot, means for moving each blade to and fro along its slot, the leading edge only of the scraper blade emerging from the open end of the slot at the end of its movement in each direction, and means for preventing further movement of the blade out of the end of the slot after the edge of the scraper blade has thus emerged.

5. A liquid strainer including in combination inlet and outlet passages for the liquid, a cylindrical straining wall having at least one circumferential straining slot through which the liquid can pass radially from one passage to the other, said wall having a part cut away so as to break the continuity of the slot in the circumferential direction and provide each slot with open ends, means for preventing radial flow of the liquid through the cut away part, a scraper blade permanently in engagement with each slot, means for moving each blade to and fro along its slot, the leading edge only of the scraper blade emerging from the open end of the slot at the end of its movement in each direction, and means for preventing further movement of the blade out of the end of the slot after the edge of the scraper blade has thus emerged.

6. A liquid strainer including in combination inlet and outlet passages for the liquid, two substantially parallel flat straining walls each having at least one straight open-ended straining slot therein through which slot the liquid can pass from one passage to the other, a scraper blade permanently in engagement with each slot, means for moving each blade along its slot until the edge of the blade emerges from the open end of the slot, and means for preventing further movement of the blade out of the end of the slot after the edge of the blade has thus emerged.

7. A liquid strainer including in combination inlet and outlet passages for the liquid, two substantially parallel flat straining walls each having at least one straight straining slot through which the liquid can pass from one passage to the other such slot being open at both ends, a scraper blade permanently in engagement with each slot, means for moving each blade to and fro along its slot the edge of the blade emerging from the open end of the slot at the end of its movement in each direction, and means for preventing further movement of the blade out of the end of the slot after the edge of the blade has thus emerged.

8. A liquid strainer including in combination inlet and outlet passages for the liquid, a cylindrical straining wall having a plurality of circumferential straining slots therein through which the liquid can flow radially from one passage to the other, said wall being cut away to break the continuity of each slot in the circumferential direction and provide each slot with open ends, means for preventing the radial flow of liquid through the cut-away part, a series of scraper blades one of which is permanently in engagement with each slot, a common supporting member for the blades such member being disposed and movable within the straining wall whereby relative oscillating movement between the scraper blades and the straining wall can be produced about the axis of the wall to cause the scraper blades to travel along the slots, the leading edge only of each scraper blade emerging from the open end of its slot at the end of the movement in each direction, and means for preventing further movement of the blades out of the ends of the slots after the edge of each scraper blade has thus emerged.

9. A liquid strainer including in combination inlet and outlet passages for the liquid, two substantially parallel flat straining walls each having a plurality of straight straining slots therein through which the liquid can pass from one passage to the other, such slots having open ends, a plurality of scraper blades one permanently in engagement with each slot, a common supporting member for the blades disposed and movable between the two parallel straining walls whereby relative oscillating movement between the scraper blades and the straining walls can be produced to cause the scraper blades to travel along the slots until the edge of each blade emerges from its slot, and means for preventing further movement of the blades out of the open ends of the slots after the edge of each blade has thus emerged.

10. A liquid strainer including in combination inlet and outlet passages for the liquid, two substantially parallel flat straining walls each having a plurality of straight straining slots therein through which the liquid can pass from one passage to the other, such slots having open ends, a plurality of scraper blades one permanently in engagement with each slot, an internally screwthreaded boss carrying the blades, a screwthreaded shaft engaging the threaded boss and disposed between the parallel straining walls, means for rotating the shaft to cause the blades to be moved simultaneously along the slots the edge of each blade emerging from the open end of the slot at the end of its movement, and means for preventing movement of the blades out of the open ends of the slots after the edge of each blade has thus emerged.

11. A liquid strainer including in combination inlet and outlet passages for the liquid, two substantially parallel flat straining walls each having a series of straight straining slots therein through which the liquid can pass from one passage to the other, such slots having open ends, a series of scraper blades one permanently in engagement with each slot, a common supporting rod connected at one end to the blades, a piston connected to the other end of the rod, a cylinder within which the piston can be caused to reciprocate by fluid pressure and thus move the blades simultaneously along the slots to clean the slots the edge of each blade emerging from the open end of the slot at the end of the movement of the piston, and means for preventing further movement of the blades out of the open ends of the slots after the edge of each blade has thus emerged.

12. A liquid strainer including in combination inlet and outlet passages for the liquid, a straining wall having at least one open-ended straining slot through which the liquid can pass from one passage to the other, a scraper blade permanently in engagement with each slot, means comprising a fluid-operated piston for moving each blade along its slot until the edge of the blade emerges from the open end of the slot and means for preventing further movement of the blade out of the open end of the slot after the edge of the blade has thus emerged.

ARTHUR HOARE.